(12) United States Patent
Chen et al.

(10) Patent No.: US 10,031,786 B2
(45) Date of Patent: Jul. 24, 2018

(54) LOCKLESS MULTITHREADED COMPLETION QUEUE ACCESS

(71) Applicant: INTERNATIONAL BUSINESS MACHINES CORPORATION, Armonk, NY (US)

(72) Inventors: Lior Chen, Jerusalem (IL); Constantine Gavrilov, Rishon Le Zion (IL); Alexander Snast, Rishon Le Zion (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 189 days.

(21) Appl. No.: 14/994,987

(22) Filed: Jan. 13, 2016

(65) Prior Publication Data

US 2017/0199772 A1    Jul. 13, 2017

(51) Int. Cl.
*G06F 9/46* (2006.01)
*G06F 9/52* (2006.01)
*G06F 9/48* (2006.01)

(52) U.S. Cl.
CPC ............ *G06F 9/524* (2013.01); *G06F 9/4812* (2013.01)

(58) Field of Classification Search
None
See application file for complete search history.

(56) References Cited

U.S. PATENT DOCUMENTS

| | | |
|---|---|---|
| 7,143,410 B1 | 11/2006 | Coffman et al. |
| 7,178,145 B2 | 2/2007 | Bono |
| 8,402,172 B2 | 3/2013 | Muppirala et al. |
| 8,843,684 B2 | 9/2014 | Jones et al. |
| 9,183,167 B2 | 11/2015 | Liu et al. |
| 2017/0228337 A1* | 8/2017 | Zhang ................. G06F 13/4027 |

FOREIGN PATENT DOCUMENTS

| | | |
|---|---|---|
| CN | 103019835 A | 4/2013 |
| DE | 102008030587 A1 | 1/2009 |

OTHER PUBLICATIONS

Anonymous, "PMU Driven Performance Prediction for Aggressive Affinitisation," An IP.com Prior Art Database Technical Disclosure, IPCOM000219133D, 2012 (6 pages).

* cited by examiner

*Primary Examiner* — Bing Zhao
(74) *Attorney, Agent, or Firm* — Griffiths & Seaton PLLC

(57) ABSTRACT

Methods, computing systems and computer program products implement embodiments of the present invention that include identifying a first number of processors in a computer, and identifying a second number of interrupt request (IRQ) lines on a hardware acceleration device in the computer and coupled to the processors, the second number greater than or equal to the first number. Each of the IRQ lines is associated with one of the processors, and upon selecting a given IRQ line for an application thread, a given processor associated with the given IRQ line is identified. Execution of the application thread is initiated on the given processor, and using the given IRQ line, a completion queue is configured for the application thread. If the thread is executing on a different processor than the one managing the completion queue, then the management of the completion queue can be migrated to the processor executing the thread.

17 Claims, 5 Drawing Sheets

LOCKLESS MULTITHREADED COMPLETION QUEUE ACCESS

FIELD OF THE INVENTION

The present invention relates generally to completion queues, and specifically to implementing lockless completion queue access in a multithreaded system.

BACKGROUND

A spinlock is a way to protect a shared resource from being simultaneously modified by two or more processes (e.g., application threads). The first process that tries to modify the resource "acquires" the spinlock and continues executing, utilizing the resource as needed. Any other processes that subsequently try to acquire the spinlock get stopped; they are said to "spin in place" waiting on the spinlock to be released by the first process.

Operating system systems (e.g., Linux) kernels can use spinlocks when sending data to a particular peripheral. Most hardware peripherals typically cannot handle multiple simultaneous state updates. Therefore, if two different modifications to a given state have to happen, one has to strictly follow the other, as they cannot overlap. A spinlock provides the necessary protection, ensuring that the modifications happen one at a time.

Peripheral Component Interconnect Express (PCIE) hardware acceleration devices like InfiniBand peripherals, fiber channel peripherals, Non-Volatile Memory Express (NVME) peripherals, and encryption or compression peripherals typically utilize application threads and drivers to define completion event handles that can be waited on by a given application thread and woken by hardware interrupt events. In some configurations a completion queue is maintained in the operating system kernel and is protected by a spinlock.

In operation, an interrupt handler takes the spinlock, adds an entry to the completion queue, and releases the spinlock. The (woken) application thread takes the spinlock with hardware interrupts disabled and removes the entry from the queue, and then releases the spinlock with interrupts enabled. Taking the spinlock is needed to protect the completion queue from corruption when the application threads are reading data from the queue while a new completion interrupt occurs simultaneously. Taking the spinlock (even uncontended) invokes an atomic operation and can severely impact performance on systems with many (e.g., tens) of processors, since atomic operations typically prevent all other processors from accessing the memory bus and a particular cache line. These (i.e., atomic) operations can be particularly expensive (i.e., resource intensive) on non-uniform memory access (NUMA) systems.

The description above is presented as a general overview of related art in this field and should not be construed as an admission that any of the information it contains constitutes prior art against the present patent application.

SUMMARY

There is provided, in accordance with an embodiment of the present invention a method, including identifying a first number of processors in a computer, identifying a second number of interrupt request (IRQ) lines on a hardware acceleration device in the computer and coupled to the processors, the second number greater than or equal to the first number, associating each of the IRQ lines with one of the processors, selecting a given IRQ line for an application thread, identifying a given processor associated with the given IRQ line, initiating execution of the application thread on the given processor, and configuring, using the given IRQ line, a completion queue for the application thread.

There is also provided, in accordance with an embodiment of the present invention an apparatus, including a hardware acceleration device, a memory, and a first number of processors, wherein a first given processor is configured to identify a second number of interrupt request (IRQ) lines on the hardware acceleration device, the second number greater than or equal to the first number, to associate each of the IRQ lines with one of the processors, to select a given IRQ line for an application thread, to identify a second given processor associated with the given IRQ line, to initiate execution of the application thread on the second given processor, and to configure, in the memory and using the given IRQ line, a completion queue for the application thread.

There is further provided, in accordance with an embodiment of the present invention a computer program product, the computer program product including a non-transitory computer readable storage medium having computer readable program code embodied therewith, the computer readable program code including computer readable program code configured to identify a first number of processors in a computer, computer readable program code configured to identify a second number of interrupt request (IRQ) lines on a hardware acceleration device in the computer and coupled to the processors, the second number greater than or equal to the first number, computer readable program code configured to associate each of the IRQ lines with one of the processors, computer readable program code configured to select a given IRQ line for an application thread, computer readable program code configured to identify a given processor associated with the given IRQ line, computer readable program code configured to initiate execution of the application thread on the given processor, and computer readable program code arranged to configure, using the given IRQ line, a completion queue for the application thread.

BRIEF DESCRIPTION OF THE DRAWINGS

The disclosure is herein described, by way of example only, with reference to the accompanying drawings, wherein.

DETAILED DESCRIPTION OF EMBODIMENTS

Spinlocks can become inefficient if held for longer durations, as they may prevent other threads from running. While a thread holds a spinlock, other threads will be left "spinning" (repeatedly trying to acquire the spinlock), resulting in a high CPU usage and postponement of execution. Furthermore, use of spinlocks imposes atomic operations, which has memory access performance penalties on multiprocessor and NUMA systems, even in the absence of the lock contention.

Embodiments of the present invention provide methods and systems implementing lockless completion queue access in a multithreaded multiprocessor system. In some embodiments, a lock primitive owned by a given processor can be implemented to avoid atomic operations in uncontended cases. When initializing a queue to be used by an application thread, the queue can be assigned to (i.e., "owned by") the given processor. Once the application thread and its completion interrupt are bound to the same processor, there is no need for spinlocks, and a check can be performed to protect against user error or to provide support for rare cases when the application thread needs to migrate to a different processor.

As described hereinbelow, a first number of processors in a computer are identified, and a second number of interrupt request (IRQ) lines on a hardware acceleration device in the computer and coupled to the processors are identified, the second number greater than or equal to the first number. Each of the IRQ lines is associated with one of the processors, and a given IRQ line for an application thread is selected. A given processor associated with the given IRQ line is identified, and upon initiating execution of an application thread on the given processor the given IRQ line is used to configure a completion queue for the application thread.

Systems implementing embodiments of the present invention may comprise PCIE devices having multiple completion queues that may even scale above number of processors. For example, some InfiniBand peripherals have 256 IRQ lines. In some embodiments, each application thread can create its own completion queue that is bound to its own completion interrupt. Furthermore, hard CPU affinity can be used for both the application thread and its completion interrupt, since they are bound to the same processor.

Figure 1:
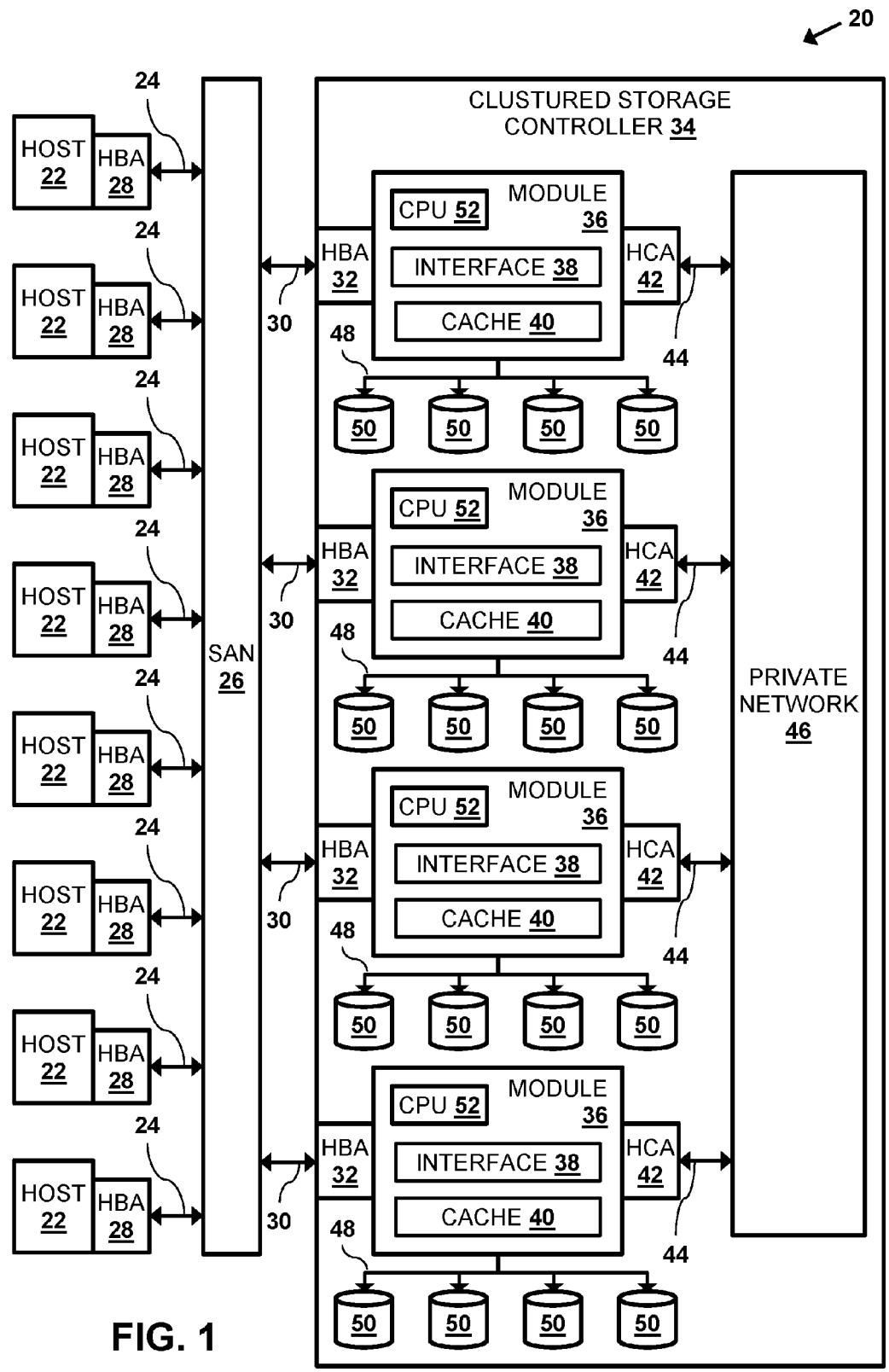
FIG. 1 is a block diagram that schematically illustrates a storage system comprising a storage controller comprising multiple modules, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs) and/or host channel adapters (HCAs). In the configuration shown in FIG. 1, clustered storage controller 34 comprises HBAs 32 and HCAs 42.

Clustered storage controller 34 implements clusters of storage modules 36, each of which includes a processor 52, an interface 40 (in communication between adapters 32 and 42), and a cache 38. Each storage module 36 is responsible for a number of storage devices 50 by way of a data connection 48 as shown.

As described previously, each storage module 36 further comprises a given cache 38. However, it will be appreciated that the number of caches 38 used in storage subsystem 20 and in conjunction with clustered storage controller 34 may be any convenient number. While all caches 38 in storage subsystem 20 may operate in substantially the same manner and comprise substantially similar elements, this is not a requirement. Each of the caches 38 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 38 coupled to respective sets of storage devices 50. In some configurations, the sets of storage devices 50 comprise one or more hard disks, or solid state drives (SSDs) which can have different performance characteristics. In response to an I/O command, a given cache 38, by way of example, may read or write data at addressable physical locations of a given storage device 50. In the embodiment shown in FIG. 1, caches 38 are able to exercise certain control functions over storage devices 50. These control functions may alternatively be realized by hardware devices such as disk controllers (not shown), which are linked to caches 38.

Each storage module 36 is operative to monitor its state, including the states of associated caches 38, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 38 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller 34 comprising any multiple of modules 36 coupled to any plurality of storage devices 50 is considered to be with the spirit and scope of the present invention.

Figure 2:
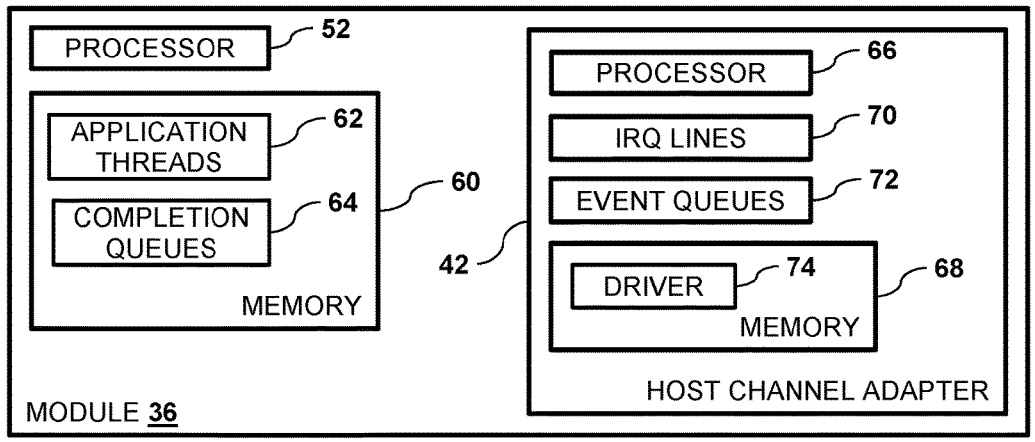
FIG. 2 is a block diagram that schematically illustrates a configuration of a given module comprising a host channel adapter, in accordance with an embodiment of the present invention.

FIG. 2 is a block diagram that schematically illustrates hardware and software modules of a given module 36, in accordance with an embodiment of the present invention. In addition to processor 52 (also referred to herein as a module processor) and HCA 42, module 36 comprises a memory 60 that stores application threads 62 (also referred to herein as execution threads) and completion queues 64. As described hereinbelow, upon initiating execution of a given application thread, processor 52 creates a given completion queue 64 for the given application thread, and uses the given completion queue to transfer information from HCA 42 to module 36.

HCA 42 comprises an adapter processor 66, interrupt request (IRQ) lines 70, event queues 72 (also known as hardware queues), and a memory 68 that stores a device driver 74. As described in the description referencing FIG. 4 hereinbelow, processor 52 executes driver 74 to configure HCA 42. PCIE hardware acceleration devices such as HCA 42 comprise IRQ lines 70 and/or multiple event queues 72 that may even scale above number of processors 52 in storage controller 34. For example, HCA 42 may comprise 256 IRQ lines 70.

While embodiments herein describe lockless access to completion queues 64 in a hardware acceleration device comprising HCA 42, providing lockless access to the completion queues in other types of hardware acceleration devices (i.e., peripherals) is considered to be within the spirit and scope of the present invention. Examples of hardware acceleration devices include, but are not limited to, data compression devices, data encryption devices, and data networking devices such InfiniBand, fiber channel and 10 GB Ethernet devices.

Additionally, a given processor 52 implementing embodiments of the present invention may comprise a physical processor or a virtual processor. In virtualized environments, a virtual processor is a processor "core" that is assigned to a virtual machine. There can be more virtual processors assigned than actual cores available, which enables multiple virtual machines to share a single processor core.

Figure 3:
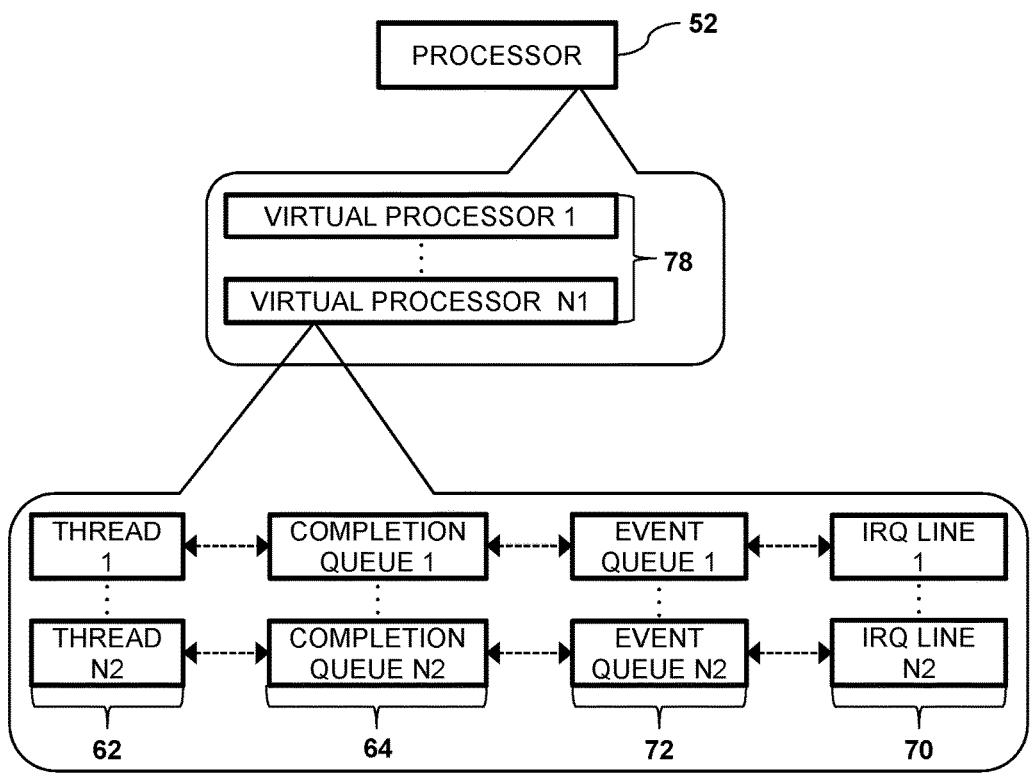
FIG. 3 is a block diagram that schematically illustrates multiple virtual processors derived from a single physical processor of the storage controller, and schematically illustrates relationships between application threads, completion queues, event queues and interrupt request lines that are associated with a given virtual processor, in accordance with an embodiment of the present invention.

FIG. 3 is a block diagram that schematically illustrates multiple virtual processors derived from a single given physical processor 52, in accordance with an embodiment of the present invention. As described hereinbelow, one or more tuples are defined comprising a given application thread 62, a given completion queue 64, a given IRQ line 70 and a given event queue 72, and each of the event queues is assigned to either a given physical processor 52 or a given virtual processor 78.

Processors 52 and 66 comprise general-purpose central processing units (CPU) or special-purpose embedded processors, which are programmed in software or firmware to carry out the functions described herein. The software may be downloaded to modules 36 and HCAs 42 in electronic form, over a network, for example, or it may be provided on non-transitory tangible media, such as optical, magnetic or electronic memory media. Alternatively, some or all of the functions of processors 52 and 66 (and 78) may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Completion Queue Management

Figure 4:
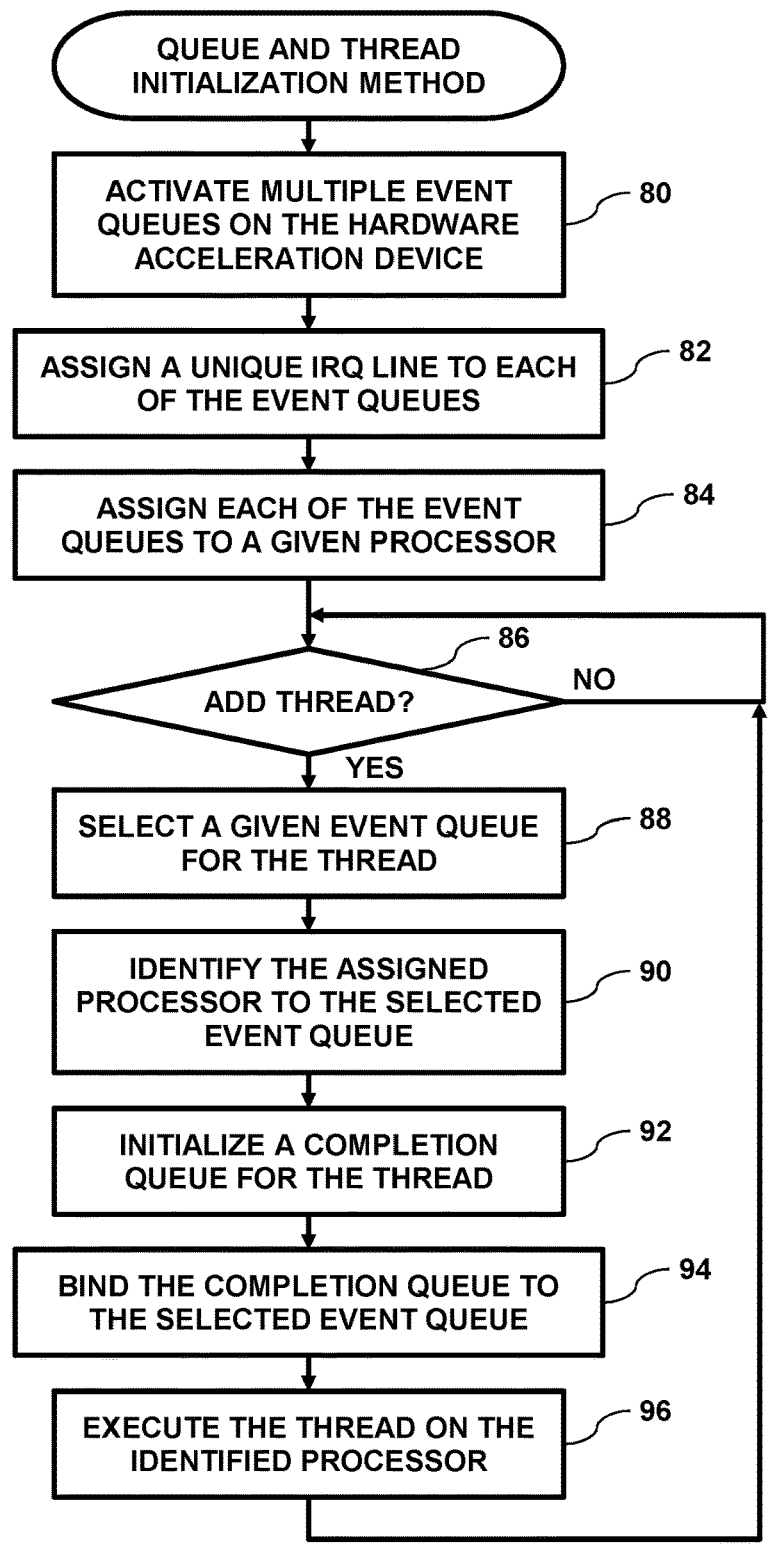
FIG. 4 is a flow diagram that schematically illustrates a method of initializing an event queue, a completion queue and an application thread, in accordance with an embodiment of the preset invention.

FIG. 4 is a flow diagram that schematically illustrates a method of initializing HCA 42 and configuring storage controller 34, in accordance with an embodiment of the present invention. In embodiments described herein (i.e., the description referencing the flow diagrams shown in FIGS. 4-7 hereinbelow), it is understood that any reference to a given (physical) processor 52 may comprise a reference to a given virtual processor 78.

In an activation step 80, driver 74 activates event queues 72 on HCA 42, and in a first assignment step 82, the device driver assigns a unique IRQ line 70 to each of the event queues. In a second assignment step 84, driver 74 or a configuration application (not shown) assigns each IRQ line to either a given physical processor 52 or to a given virtual processor 78. By assigning each given IRQ line 70 to a given processor 52 or 78, each event queue 72 becomes associated with the processor that is used for processing the event queue messages.

In a condition step 86, a given processor 52 waits until it receives a request to add (i.e., start executing) a given application thread 62, and upon receiving the request, the given processor selects a given event queue 72 for the given application thread in a selection step 82, and in an identification step 90, the given processor identifies which processor 52 is assigned to the given event queue. In some embodiments processor 52 can use a "round robin" method to select the given event queue.

The given processor initializes, in memory 60, a given completion queue 64 in an initialization step 92, and binds the given completion queue to the selected event queue in a binding step 94. Finally, in an execution step 96, the given processor transfers execution of the given application thread to the identified processor, thereby enabling the given application thread to start executing on the identified processor, and the method ends.

Figure 5:
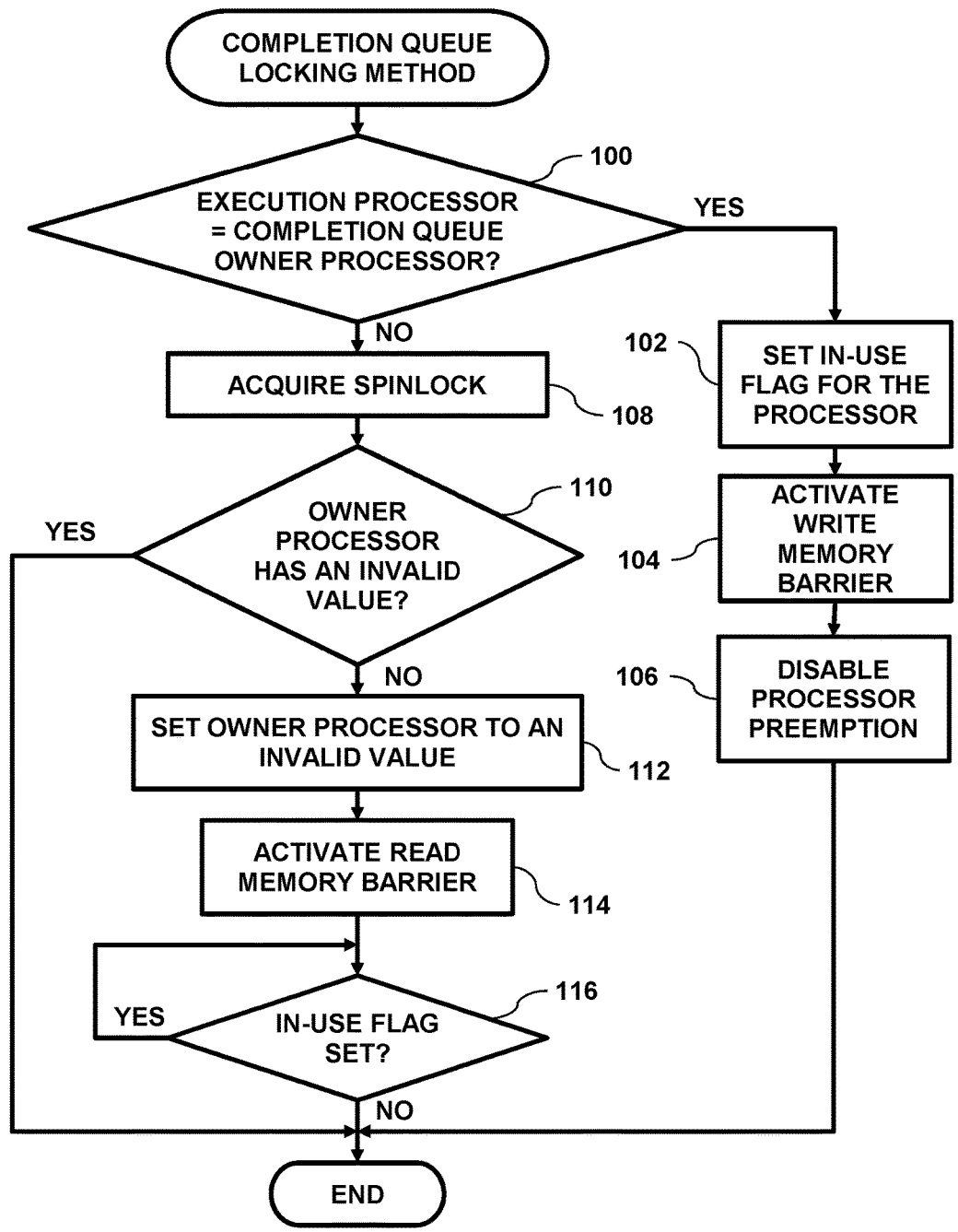
FIG. 5 is a flow diagram that schematically illustrates a method of locking the completion queue, in accordance with an embodiment of the preset invention.

FIG. 5 is a flow diagram that schematically illustrates a method of using a lock structure to lock a given completion queue 64, in accordance with an embodiment of the preset invention. The lock structure contains at least the following fields:

An owner processor (describes on which processor 52 the lock is expected to happen)
A spinlock of a relevant preemption type (described hereinbelow).
An in-use flag.

In embodiments described herein, a first given processor 52 that is executing the lock execution context may also be referred to as a "execution processor", and a second given processor 52 that is associated with (i.e., bound to) the respective completion queue 64 for given application thread may also be referred to as the "completion queue owner processor".

In a comparison step 100, the execution processor is compared with the completion queue owner processor. Taking the "yes" branch in comparison 100 represents an optimized (i.e., a "light") lock that does not require spinlocks or use of atomic operations. The optimized lock is taken if the owner processor of the lock structure matches the processor on which the thread or the interrupt execute. In a first set step 102 of the "yes" branch, the execution thread sets the in-use flag for the lock structure, and in a first activation step 104, the execution thread activates (i.e., invokes) a write memory barrier (e.g., by calling a wmb( ) function). Write memory barriers control the order of writes to memory in reference to other instructions. Modern processors can reorder operations if they do not see the logical dependency of the operations on one another. For example, writing to two different memory locations can be reordered by the processor. Using a write memory barrier ensures that no reorder will take place.

Finally in a disable step 106, the execution thread disables preemption for the execution processor and the method ends. The type of disabled preemption depends on the context types which contend for the lock. Modern operating systems allow preemption (scheduling the running thread out and switching to a different context) even if the current context is kernel context. If a new context wants to take the same lock, as the lock taken by the old context, then a deadlock may occur. Modern operating system distinguishes between user, kernel, interrupt, and software interrupt contexts. Typically, completion queues are populated in interrupt context, and in such a case, the step 106 shall disable interrupts.

Returning to comparison step 100, if the execution processor is not the same given processor 52 as the completion queue owner processor, then the "no" branch is taken. This starts the slow (standard) lock path with the goal to configure the lock structure to always take the slow (standard) lock path from now on. In an acquire step 108, the execution thread acquires a spinlock. In comparison step 110, the execution thread checks if the owner processor field of the lock structure is set to an invalid value.

If the owner processor is set to an invalid value, then the lock method ends. The invalid value of the processor owner field comprises a value that will never match a real processor number (e.g., −1). If the processor owner value for the lock structure is valid, then the execution thread sets it to the invalid value in a second set step 112, and activates a read memory barrier in a second activation step 114. Read memory barriers control the order of reads from memory 60 in reference to other instructions. Modern processors can reorder operations if they do not see the logical dependency of the operations on one another. For example, reading from one memory location and writing to another memory location can be reordered by the processor. Using read memory barrier ensures that no reorder will take place.

Setting the owner processor to an invalid value ensures that subsequent instances of the lock function will take the slow path invoking a spinlock, because the processor affinity constraint (i.e., expecting that locks are taken on the owner processor) has been violated. This may happen, for example, because the owner processor has been removed or taken offline, and the system has to reassign the affinity of the interrupts and the application threads.

In a second spin step 116, the execution thread "spins" while the in-use flag is set for the lock structure, and the method ends if/when the in-use flag is not set (i.e., clears). Spinning for the in-use flag to clear is required, because the lock can be taken by another execution context that runs on the owner processor, as it is indicated by the in-use flag. Once the in-use flag is cleared, the owner processor is set to an invalid value, and all following lock function invocation will simply take the spinlock.

Figure 6:
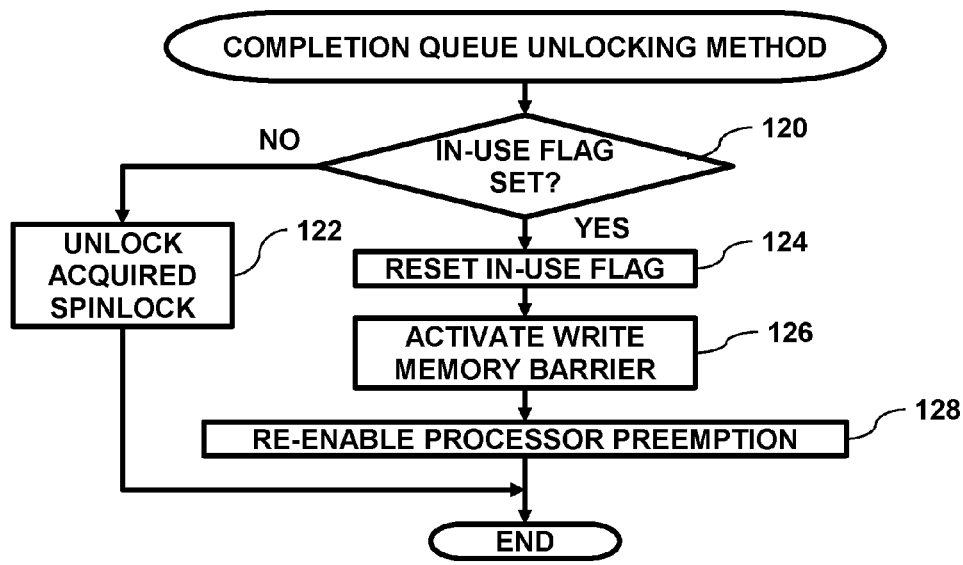
FIG. 6 is a flow diagram that schematically illustrates a method of unlocking the completion queue, in accordance with an embodiment of the preset invention.

FIG. 6 is a flow diagram that schematically illustrates a method of unlocking a given completion queue 64, in accordance with an embodiment of the preset invention. In a comparison step 120, the in-use flag of the lock structure is examined. If the in-use flag is not set, (i.e., the "no" branch) then in an unlock step 122, the execution thread associated with the given completion queue unlocks an acquired spinlock, and the method ends. The "no" branch represents the slow path of the locking functions after an affinity constraint has been violated, and is always taken by the same execution context as taken by the slow lock path.

Returning to comparison step 120, (the "yes" branch), if in the in-use flag is set for the lock structure, then the execution thread resets the in-use flag in a reset step 124, and activates a write memory barrier in an activation step 126. Finally, in a preemption step 128, the execution thread re-enables preemption for the application processor, and the method ends. Taking the "yes" branch represents the fast path of the locking functions (when the affinity constraint has been satisfied), and is always taken by the same execution context as taken by the fast lock path.

Figure 7:
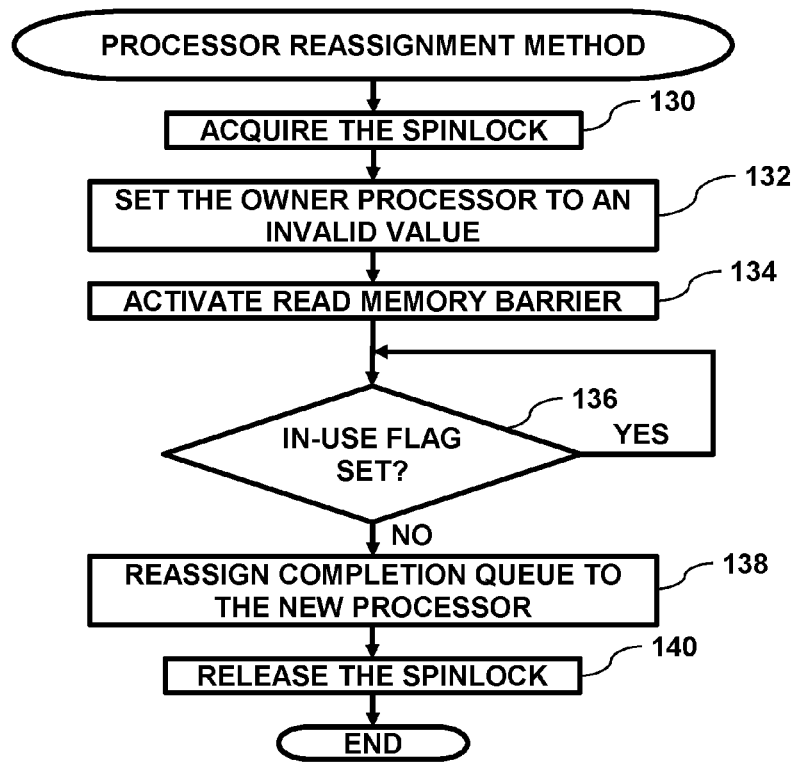
FIG. 7 is a flow diagram that schematically illustrates a method of reassigning the completion queue from a first processor of the storage system to a second processor of the storage system, in accordance with an embodiment of the preset invention.

FIG. 7 is a flow diagram that schematically illustrates a method of reassigning the completion queue from a first given processor 52 to a second given processor 52, in accordance with an embodiment of the preset invention. Reassigning the completion queue to a different processor 52 may be required when the previous valid affinity constraint has become invalid. This may happen if a previous owner processor went off-line and the operating system needs to reassign placement of applications and interrupts.

Reassigning the processor can be either a static decision (e.g., in response to the event from the operating system on the new affinity configuration) or a dynamic (e.g., an "auto-learn") decision. In the dynamic approach, the locking function can record the locking execution processor, and if it repeats for some time without change, then the new owner can be chosen.

In an acquire step 130, the execution thread acquires a spinlock, and in a set step 132, the execution thread sets the processor owner flag for the lock structure to an invalid value. Setting the owner processor flag to the invalid value ensures that further lock invocations will wait for the spinlock to be released.

In an activation step 134, the execution thread activates a read memory barrier, and in a spin step 136, the execution thread spins until the in-use flag for the lock structure is not set. Spinning for the in-use flag to be cleared is required to wait for any possible lock taken by the previous owner processor to be released. In a reassignment step 138, the new owner processor is recorded in the lock structure. Finally, in a release step 140, the execution thread releases the acquired spinlock, and the method ends.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
identifying a first number of processors in a computer;
identifying a second number of interrupt request (IRQ) lines on a hardware acceleration device in the computer and coupled to the processors, the second number greater than or equal to the first number;
associating, using a device driver by a first given one of the processors, each of the IRQ lines with one of the processors;
selecting, by the first given processor, a given IRQ line for an application thread;
identifying, by the first given processor, a second given one of the processors associated with the given IRQ line;
initiating, by the first given processor, execution of the application thread on the second given processor;
configuring through the device driver by the first given processor, using the given IRQ line, a completion queue for the application thread; and
prior to selecting the given IRQ line, identifying a plurality of event queues on the hardware acceleration device, and associating each of the IRQ lines with one of the event queues by the first given processor; wherein a given one of the event queues is bound to the completion queue prior to the first given processor initiating execution of the application thread on the second given processor; and wherein the second given processor is configured to lock the completion queue upon detecting that the given IRQ line is associated with a third given one of the processors by acquiring a spinlock for the completion queue, setting an processor owner flag to an invalid value, activating a read memory barrier, waiting for an in-use flag to clear, and releasing the spinlock.

2. The method according to claim 1, wherein selecting the given IRQ line for the application thread comprises selecting the given event queue associated with the IRQ line.

3. The method according to claim 1, and comprising performing by the second given processor: conveying, by the application thread, an operation to the hardware acceleration device, receiving a notification indicating completion of the operation, locking the completion queue in response to the notification, retrieving completion information from the locked completion queue, and unlocking the locked completion queue.

4. The method according to claim 3, wherein locking the completion queue comprises setting an in-use flag for the second given processor, activating a write memory barrier for the second given processor, and disabling preemption for the second given processor.

5. The method according to claim 4, and comprising associating, by the second given processor, the given IRQ line with the second given processor, thereby associating the given event queue and the completion queue with the second given processor.

6. The method according to claim 1 wherein the hardware acceleration device is selected from a group consisting of a data networking device, a data compression device, a data encryption device and a non-volatile memory express device, and wherein the processor is selected from a group consisting of a physical processor and a virtual processor.

7. An apparatus, comprising:
a hardware acceleration device;
a memory; and
a first number of processors, wherein a first given one of the processors is configured:
to identify a second number of interrupt request (IRQ) lines on the hardware acceleration device, the second number greater than or equal to the first number,
to associate, using a device driver, each of the IRQ lines with one of the processors,
to select a given IRQ line for an application thread,
to identify a second given one of the processors associated with the given IRQ line,
to initiate execution of the application thread on the second given processor,
to configure through the device driver, in the memory and using the given IRQ line, a completion queue for the application thread, and
prior to selecting the given IRQ line, to identify a plurality of event queues on the hardware acceleration device, and to associate each of the IRQ lines with one of the event queues by the first given processor; wherein a given one of the event queues is bound to the completion queue prior to the first given processor initiating execution of the application thread on the second given processor; and wherein the second given processor is configured to lock the completion queue upon detecting that the given IRQ line is associated with a third given one of the processors by acquiring a spinlock for the completion queue, setting an processor owner flag to an invalid value, activating a read memory barrier, waiting for an in-use flag to clear, and releasing the spinlock.

8. The apparatus according to claim 7, wherein the hardware acceleration device comprises an adapter processor, and wherein the first given processor is configured to select the given IRQ line for the application thread by selecting the given event queue associated with the IRQ line.

9. The apparatus according to claim 7, wherein the second given processor executing the application thread is configured: to convey an operation to the hardware acceleration device, to receive a notification indicating completion of the operation, to lock the completion queue in response to the notification, to retrieve completion information from the locked completion queue, and to unlock the locked completion queue.

10. The apparatus according to claim 9, wherein the second given processor is configured: to lock the completion queue by setting an in-use flag for the second given processor, to activate a write memory barrier for the second given processor, and to disable preemption for the second given processor.

11. The apparatus according to claim 10, wherein the second given processor is configured to associate the given IRQ line with the second given processor, thereby associating the given event queue and the completion queue with the second given processor.

12. The apparatus according to claim 11 wherein the hardware acceleration device is selected from a group consisting of a data networking device, a data compression device, a data encryption device and a non-volatile memory express device, and wherein each of the first number of processors is selected from a group consisting of a physical processor and a virtual processor.

13. A computer program product, the computer program product comprising:
   a non-transitory computer readable storage medium having computer readable program code embodied therewith, the computer readable program code comprising:
   computer readable program code configured to identify a first number of processors in a computer;
   computer readable program code configured to identify a second number of interrupt request (IRQ) lines on a hardware acceleration device in the computer and coupled to the processors, the second number greater than or equal to the first number;
   computer readable program code configured to associate, using a device driver by a first given one of the processors, each of the IRQ lines with one of the processors;
   computer readable program code configured to select, by the first given processor, a given IRQ line for an application thread;
   computer readable program code configured to identify, by the first given processor, a second given one of the processors associated with the given IRQ line;
   computer readable program code configured to initiate, by the first given processor, execution of the application thread on the second given processor;
   computer readable program code arranged to configure through the device driver by the first given processor, using the given IRQ line, a completion queue for the application thread; and
   computer readable program code configured, prior to selecting the given IRQ line, to identify a plurality of event queues on the hardware acceleration device, and to associate each of the IRQ lines with one of the event queues by the first given processor; wherein a given one of the event queues is bound to the completion queue prior to the first given processor initiating execution of the application thread on the second given processor; and wherein the second given processor is configured to lock the completion queue upon detecting that the given IRQ line is associated with a third given one of the processors by acquiring a spinlock for the completion queue, setting an processor owner flag to an invalid value, activating a read memory barrier, waiting for an in-use flag to clear, and releasing the spinlock.

14. The computer program product according to claim 13, wherein the computer readable program code is configured to select the given IRQ line for the application thread by selecting the given event queue associated with the IRQ line by the first given processor.

15. The computer program product according to claim 13, and comprising computer readable program code configured, by the second given processor: to convey, by the application thread, an operation to the hardware acceleration device, to receive a notification indicating completion of the operation, to lock the completion queue in response to the notification, to retrieve completion information from the locked completion queue, and to unlock the locked completion queue.

16. The computer program product according to claim 15, wherein the computer readable program code is configured, by the second given processor: to lock the completion queue by setting an in-use flag for the given processor, to activate a write memory barrier for the given processor, and to disable preemption for the second given processor.

17. The computer program product according to claim 16, and comprising computer readable program code configured to associate, by the second given processor, the given IRQ line with the second given processor, thereby associating the given event queue and the completion queue with the second given processor.

* * * * *